United States Patent
Wu et al.

(10) Patent No.: US 8,512,529 B2
(45) Date of Patent: *Aug. 20, 2013

(54) MULTI-PORT CHLORINE GENERATOR

(75) Inventors: Yicun Wu, Oak Park, CA (US); Greg Cwik, West Hills, CA (US); Randy Tan, Camarillo, CA (US)

(73) Assignee: Zodiac Pool Systems, Inc., Vista, CA (US)

( * ) Notice: Subject to any disclaimer, the term of this patent is extended or adjusted under 35 U.S.C. 154(b) by 249 days.

This patent is subject to a terminal disclaimer.

(21) Appl. No.: 13/018,703

(22) Filed: Feb. 1, 2011

(65) Prior Publication Data

US 2011/0186494 A1  Aug. 4, 2011

Related U.S. Application Data (63) Continuation of application No. 11/346,650, filed on Feb. 3, 2006, now Pat. No. 7,879,208.

(51) Int. Cl.
*C02F 1/461* (2006.01)
*C02F 103/42* (2006.01)
*C25B 9/02* (2006.01)

(52) U.S. Cl.
USPC .................................. 204/278.5; 210/167.11

(58) Field of Classification Search
None
See application file for complete search history.

(56) References Cited

U.S. PATENT DOCUMENTS

| | | | |
|---|---|---|---|
| 2,113,203 A | 4/1938 | Straubel | |
| 3,195,558 A | 7/1965 | Klueber et al. | |
| 3,401,116 A | 9/1968 | Stanwood | |
| 3,482,740 A | 12/1969 | Evans et al. | |
| D224,401 S | 7/1972 | Clinton | |
| 3,792,979 A | 2/1974 | Clinton | |
| 4,129,493 A | 12/1978 | Tighe et al. | |
| 4,217,331 A | 8/1980 | Schaub | |
| 4,333,493 A | 6/1982 | Beiswenger et al. | |
| 4,350,666 A | 9/1982 | Klutts | |
| 4,381,240 A | 4/1983 | Russell | |
| 4,402,912 A | 9/1983 | Krueger et al. | |
| 4,439,295 A * | 3/1984 | Richards | 210/97 |
| 4,473,533 A | 9/1984 | Davey | |
| 4,519,889 A * | 5/1985 | Pellegri et al. | 204/278.5 |
| 4,525,272 A | 6/1985 | Henson | |
| 4,584,106 A | 4/1986 | Held | |
| 4,613,415 A * | 9/1986 | Wreath et al. | 205/335 |
| 4,691,732 A | 9/1987 | Johnson et al. | |
| 4,713,170 A | 12/1987 | Saibic | |
| 4,714,534 A * | 12/1987 | Fair et al. | 204/269 |
| 4,724,059 A | 2/1988 | Collier | |
| 4,790,923 A * | 12/1988 | Stillman | 204/268 |

(Continued)

OTHER PUBLICATIONS

International Search Report, PCT/US07/61520, Dec. 7, 2007, 3 pages.

(Continued)

*Primary Examiner* — Harry D Wilkins, III
(74) *Attorney, Agent, or Firm* — Dorsey & Whitney LLP (57) ABSTRACT

A chlorine treatment apparatus includes a housing with a cavity containing a chlorine generator for chlorinating a liquid such as water and at least three openings to the cavity. The chlorine generator may be an electrolytic cell. Some embodiments may include one or more plugs for closing the openings. The plugs may be keyed to operate with only certain of the openings. Yet other embodiments may include sensors for monitoring various aspects of the liquid such as temperature, salinity, flow rate, and chlorine concentration.

20 Claims, 7 Drawing Sheets

(56) References Cited

U.S. PATENT DOCUMENTS

| | | |
|---|---|---|
| 4,808,290 A | 2/1989 | Hilbig |
| 4,822,571 A | 4/1989 | Nicholson et al. |
| 4,825,528 A | 5/1989 | Nicholson et al. |
| 4,828,803 A | 5/1989 | Nicholson et al. |
| 4,828,804 A | 5/1989 | Nicholson et al. |
| 4,828,805 A | 5/1989 | Connors |
| 4,861,451 A | 8/1989 | David |
| 4,936,979 A * | 6/1990 | Brown ............... 210/85 |
| D309,493 S | 7/1990 | Casberg |
| 4,997,540 A * | 3/1991 | Howlett ............ 204/271 |
| 5,221,444 A | 6/1993 | Silveri |
| 5,221,451 A | 6/1993 | Seneff et al. |
| 5,228,964 A * | 7/1993 | Middleby ............ 204/194 |
| 5,314,589 A | 5/1994 | Hawley |
| 5,460,702 A * | 10/1995 | Birkbeck et al. ......... 210/748.17 |
| 5,460,706 A | 10/1995 | Lisboa |
| 5,476,116 A | 12/1995 | Price et al. |
| 5,490,935 A | 2/1996 | Guy |
| D371,824 S | 7/1996 | Price et al. |
| 5,545,310 A | 8/1996 | Silveri |
| 5,676,805 A | 10/1997 | Silveri |
| 5,690,818 A | 11/1997 | Guy |
| 5,714,061 A | 2/1998 | Guy et al. |
| 5,752,282 A | 5/1998 | Silveri |
| 5,753,100 A | 5/1998 | Lumsden |
| 5,759,384 A | 6/1998 | Silveri |
| 5,766,454 A | 6/1998 | Cox et al. |
| 5,783,071 A | 7/1998 | Guy |
| 5,797,415 A * | 8/1998 | Nicholson et al. ......... 137/15.01 |
| 5,879,550 A | 3/1999 | Cox |
| 5,885,426 A | 3/1999 | Silveri |
| 5,951,860 A | 9/1999 | Guy |
| 5,954,953 A | 9/1999 | Guy et al. |
| 6,007,693 A | 12/1999 | Silveri |
| 6,059,942 A | 5/2000 | Barnes et al. |
| 6,083,397 A | 7/2000 | Cox |
| 6,217,761 B1 | 4/2001 | Catanzaro et al. |
| 6,235,188 B1 | 5/2001 | Nakamura et al. |
| 6,238,553 B1 * | 5/2001 | Lin .................. 210/94 |
| 6,238,555 B1 | 5/2001 | Silveri et al. |
| D451,979 S | 12/2001 | VanErdewyk |
| 6,332,978 B1 | 12/2001 | Catanzaro et al. |
| 6,627,053 B2 | 9/2003 | Hirota et al. |
| D486,881 S | 2/2004 | Pecci et al. |
| 6,814,858 B2 | 11/2004 | Yamamoto et al. |
| 6,827,847 B1 * | 12/2004 | Chauvier ............ 210/138 |
| 6,942,788 B1 | 9/2005 | Cox et al. |
| 7,005,065 B1 | 2/2006 | Guy et al. |
| 7,008,529 B2 | 3/2006 | Nakanishi et al. |
| 7,014,769 B1 | 3/2006 | Cox et al. |
| 7,223,343 B1 | 5/2007 | Cox et al. |
| 7,250,610 B1 | 7/2007 | Cox et al. |
| 7,329,343 B1 * | 2/2008 | Barnes ............ 210/167.1 |
| 7,341,660 B1 | 3/2008 | Guy et al. |
| 7,402,252 B2 | 7/2008 | Kadlec et al. |
| 7,658,834 B2 | 2/2010 | Salerno |
| 7,695,613 B2 | 4/2010 | Doyle et al. |
| 8,277,621 B2 | 10/2012 | Hui |
| 2005/0029118 A1 | 2/2005 | Holstein et al. |
| 2005/0077190 A1 | 4/2005 | Djordjevic |
| 2006/0169647 A1 | 8/2006 | Doyle et al. |
| 2006/0231470 A1 | 10/2006 | Hatch et al. |
| 2007/0181439 A1 | 8/2007 | Wu et al. |
| 2007/0207053 A1 | 9/2007 | Doyle et al. |
| 2011/0173799 A1 | 7/2011 | Wu et al. |

OTHER PUBLICATIONS

Office Action dated Apr. 8, 2011, Canadian Patent Application No. 2,641,237, 3 pages.
Author Unknown, Atlantis Natural Saltwater Pool Systems,"Sanitize your swimming pool naturally with an Atlantis salt water pool chlorinator!", 2 pages, 2002, Ocean Magic Enterprises.
Author Unknown, Atlantis Natural Saltwater Pool Systems,"Questions and Answers", 2 pages, 2002, Ocean Magic Enterprises.
Author Unknown, Atlantis Natural Saltwater Pool Systems, "How Does Natural Saltwater Sanitizing Work?", 1 page, 2002, Ocean Magic Enterprises.
Author Unknown, Atlantis Natural Saltwater Pool Systems, "Installation Diagram," 2 pages, 2002, Ocean Magic Enterprises.
Author Unknown, Autopilot Systems, Inc., Pool Pilot Patented Bypass Manifold specification sheet, 2 pages, http://www.autopilot.com/patented_bypass_manifold.html, accessed Apr. 11, 2008.
Author Unknown, Autopilot Systems, Inc., Frequently Asked Questions, 3 pages, http://www.autopilot.com/faq.html, accessed Apr. 11, 2008.
Author Unknown, Balboa Instruments- ECOmatic, specification sheet, 1 page, http://www.balboa-instruments.com/page470.html, accessed Apr. 11, 2008.
Jandy AquaPure Electronic Chlorine Generator, Installation and Operation Manual, Jandy Pool Products, Inc., 2005, 37 pages.
Jandy 2007 Catalog, Water Purification Systems, Jandy Pool Products, Inc., pp. 133-134.
Jandy 2007 Catalog, Water Purification Parts, Jandy Pool Products, Inc., pp. 135-137.
Jandy 2008 Catalog, Water Purification Systems, Jandy Pool Products, Inc., pp. 147-149.
Jandy 2008 Catalog, Water Purification Parts, Jandy Pool Products, Inc., pp. 150-153.
Zodiac 2009 Catalog, Water Purification Systems, Zodiac Pool Systems, Inc., 35 pages.
Zodiac 2010 Catalog, Water Purification Parts, Zodiac Pool Systems, Inc., 19 pages.
Office Action dated Mar. 5, 2012, Canadian Patent Application No. 2,641,237, 2 pages.

\* cited by examiner

MULTI-PORT CHLORINE GENERATOR

CROSS-REFERENCE TO RELATED APPLICATION

This application is a continuation of U.S. patent application Ser. No. 11/346,650, entitled "MULTI-PORT CHLORINE GENERATOR", filed on Feb. 3, 2006, now U.S. Pat. No. 7,879,208, which is hereby incorporated by reference herein in its entirety.

BACKGROUND OF THE INVENTION a. Field of the Invention

The present invention relates generally to pool products, and more particularly to a generator for producing chlorine.

b. Background Art

Most residential and commercial pools and hot tubs suffer from the growth of mold and bacteria, or at least the possibility of such growth. Left unchecked, mold and bacteria may not only discolor the pool water or the pool itself, but also pose a serious health hazard both to swimmers and people in proximity to the pool.

A common solution to inhibit mold and bacteria growth is to chlorinate water in the pool. Typically, chlorination is accomplished by loading water intended for use in the pool with a chlorine salt. The water and associated salt are passed through a chlorine generator. As the water passes through the generator, it may flow through or across a charged device which electrolyzes the salts, releasing the chlorine into the water.

However, most chlorine generators are relatively simple structurally and have only two ports—one for water intake and one for water outflow. Although this may prove viable for many pool owners, oftentimes a chlorine generator must be placed near a bend in piping, in cramped quarters, or in another area where the piping essentially prohibits (or renders very difficult) installation.

Further, in certain cases it may be desirable to use a single chlorine generator to supply chlorinated water to two pools or hot tubs. If a standard two-port chlorine generator is used, a T-junction in the pipe downstream from the generator is also necessary.

Accordingly, what is needed in the art is an improved chlorine generator.

SUMMARY OF THE INVENTION

One embodiment of the present invention takes the form of an apparatus for generating chlorine and includes a housing and first, second, and third apertures. The housing defines a cavity, and each of the first, second, and third apertures are in fluid communication with the cavity. Another embodiment of an apparatus for generating chlorine includes a housing, a chlorine generating apparatus, and first, second and third apertures. The housing includes a first housing segment attached to a second housing segment. The first and second housing segments define a cavity containing the chlorine generating apparatus, and the first, second, and third apertures are in fluid communication with the cavity. Yet another embodiment of an apparatus for generating chlorine includes a housing, a chlorine generating apparatus, at least three ports, and a plug. The housing defined a cavity, which contains the chlorine generating apparatus. Each port is in fluid communication with the cavity, and the plug is selectively operative with at least one of the ports.

A method for manufacturing a chlorine generator includes providing first and second housing segments, each defining a cavity. Electrical connections associated with a chlorine generating apparatus are inserted through matching apertures defined in the first housing segment. The chlorine generating apparatus is pivoted relative to the first housing segment to substantially align a longitudinal axis of the chlorine generating apparatus with a longitudinal axis of the first housing segment. The first and second housing segments are joined together to house the chlorine generator.

DETAILED DESCRIPTION OF THE INVENTION

One embodiment of the present invention takes the form of an apparatus for chlorinating a fluid. The embodiment includes a housing having a cavity. The cavity is in fluid communication with three ports defined on the housing. A fluid enters the cavity through a first port and exits the cavity through a second port. The first port may be in fluid communication with a fluid source. The second port may be in fluid communication with an apparatus that uses or stores a chlorinated fluid. A plug may be operatively associated with the third port and prevent fluid from entering or exiting the cavity through the third port. The plug may be keyed so that it can be associated with only certain of the three ports. As the fluid passes through the cavity, a chlorine generator contained within the cavity chlorinates the fluid. The chlorine generator may require electricity, which can be supplied by operatively associating the chlorine generator with an electrical power source. The chlorinated fluid can be supplied to a pool, spa, or other apparatus that uses or stores a chlorinated fluid. The fluid chlorinating apparatus may be used in spaces that have limited configuration or installation space.

Figure 1:
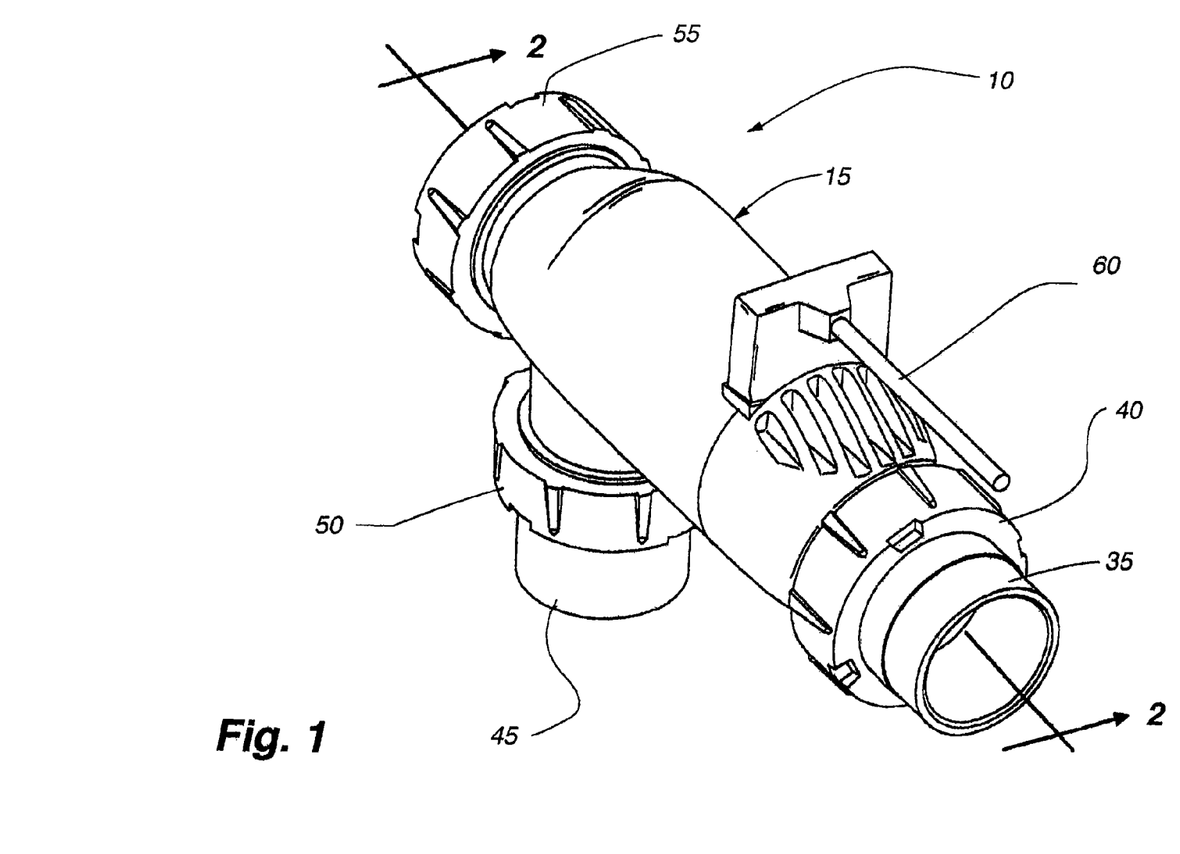
FIG. 1 depicts a perspective view of a first embodiment of an apparatus for chlorinating a fluid.

FIG. 1 depicts a perspective view of a first embodiment of an apparatus for chlorinating a fluid 10. The embodiment includes a housing 15 having a first, second, and third port. A first tailpiece 35 may be operatively associated with the housing 15 using a first nut 40, and second tailpiece 45 may be operatively associated with the housing 15 using a second nut 50 (e.g., by screwing the respective tailpieces 35, 45 to the housing 15). The first and second tailpieces 35, 45 may each include apertures for the passage of fluid, and may be adapted to be operatively associated with fluid conduits (not shown) such as pipes, tubes, channels, ducts, and so on (e.g., the tailpieces 35, 45 may be attached either removably or fixedly to a conduit). A third nut 55 may be operatively associated with the housing 15. The housing 15, the tailpieces 35, 45, and the nuts 40, 50, 55 may be composed of metal, plastic, rubber, concrete, carbon composites, another suitable material, or some combination thereof. A power cord 60 may connect a power source (not shown) to a chlorine generator 65 contained within the housing 15 and shown in FIGS. 2 and 3, providing electrical power to the chlorine generator 65.

Figure 2:
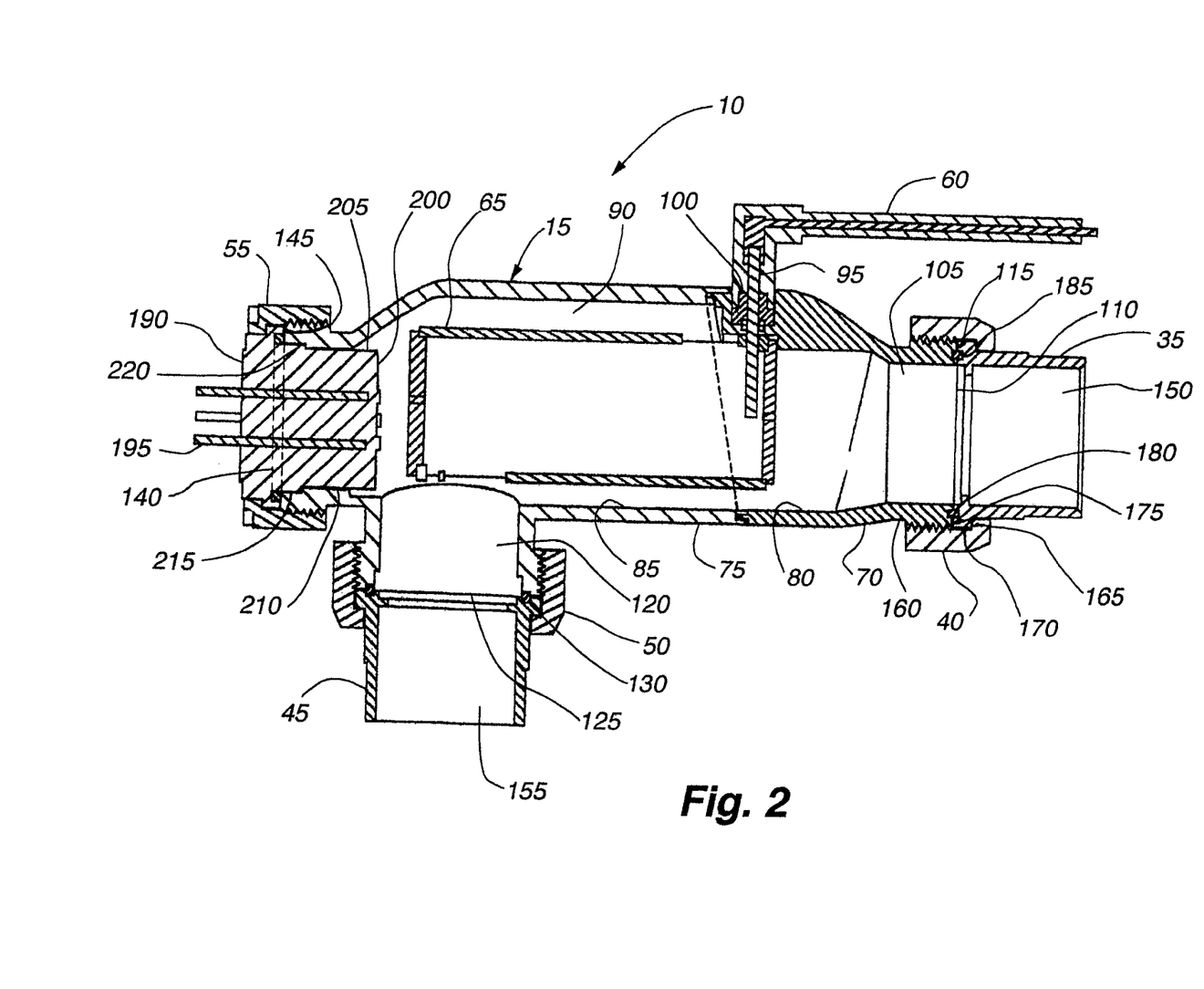
FIG. 2 depicts a cross-sectional view of the embodiment shown in FIG. 1, taken along a longitudinal axis of the apparatus.

FIG. 2 depicts a cross-sectional view of the embodiment shown in FIG. 1, taken along a longitudinal axis of the apparatus 10. The housing 15 may include a first housing segment 70 and a second housing segment 75 adapted to mate with one another. Interior surfaces 80, 85 of the first and second housing segments 70, 75 define a cavity 90 inside the housing 15. The cavity 90 may receive the chlorine generator 65, which may include electrical connections 95 to connect to the power cord 60. As will be discussed in more detail with respect to FIG. 3, a terminal adapter 100 received within a recessed area of the first housing segment 70 assists in preventing fluid from escaping the cavity 90 where the electrical connections 95 extend out of the cavity 90 of the housing 15.

A first fluid aperture 105, defined by an interior surface 80 of the first housing segment 70, extends from the cavity 90 to a first port 110 defined by a first end surface 115 of the first housing segment 70. A second fluid aperture 120, defined by an interior surface 85 of the second housing segment 75, extends from the cavity 90 to a second port 125 defined by a first end surface 130 of the second housing segment 75. A third fluid aperture 135 (see FIG. 3), defined by an interior surface 85 of the second housing segment 75, extends from the cavity 90 to a third port 140 defined by a second end surface 145 of the second housing segment 75. The fluid apertures 105, 120, 135 enable fluid communication between the ports 110, 125, 140 and the cavity 90. A fluid may be delivered to and from the first and second ports 110, 125 of the housing 15 via passages 150, 155 in the first and second tailpieces 35, 45. As shown in the embodiment depicted in FIG. 2, the first and second tailpieces 35, 45 may be selectively attached to the housing 15 using the first and second nuts 40, 50, respectively.

The first nut 40 may include a threaded portion adapted to engage a mating threaded portion on an exterior surface 160 of the first housing segment 70. The first nut 40 may also include a surface 165 adapted to bear against a lip 170 of the first tailpiece 35. An end surface 175 of the first tailpiece 35, which may be adapted to substantially match the first end surface 115 of the first housing segment 70, may be positioned adjacent to and in proximate contact with the first end surface 115 of the first housing segment 70, thereby substantially co-axially aligning the passage 150 extending through the first tailpiece 35 and the first port 110 in the housing 15. As the first nut 40 is threaded onto the first housing segment 70, the surface 165 of the first nut 40 bears on the lip 170 of the first tailpiece 35, thereby pushing the end surface 175 of the first tailpiece 35 against the first end surface 115 of the first housing segment 70 and functionally maintaining the alignment. A first seal element 180 may be positioned between the end surfaces 175, 115 of the first tailpiece 35 and the first housing segment 70 to prevent fluid from leaking through the joint between the first housing segment 70 and the first tailpiece 35. The end surface 175 of the first tailpiece 35 may include a groove 185 adapted to receive the first seal element 180, if present. In other embodiments, the first end surface 115 of the first housing segment 70 (rather than the end surface 175 of the first tailpiece 35) may be adapted to receive the seal element 180, if present. Alternatively, both end surfaces 115, 175 may be adapted to receive the seal element 180, if present.

The second nut 50 may join the second housing segment 75 to the second tailpiece 45 in the manner generally described above with respect to the first nut 40. Likewise, the third nut 55 may be structurally similar to the first and second nuts 40, 50 and may mate with its respective housing segment in a similar manner. A plug 190 may be associated with one of the nuts, such as the second or third nut 50, 55.

The plug 190 may include sensors 195 for detecting desired information concerning the fluid flowing through chlorine generator 65, including one or more the following: the temperature, salinity, chlorine concentration, flow rate, or other characteristics of the fluid. The plug 190 may also include an exterior first end surface 200 and an exterior side surface 205 adapted to be received within a fluid aperture (such as the third fluid aperture 135) of the housing 15. The exterior first end surface 200 and a portion of the exterior side surface 205 may extend beyond the sidewall 210 defining the third fluid aperture 135 of the housing 15 and into the cavity 90. In some embodiments, however, only the exterior first end surface 200 extends beyond the length of the third fluid aperture 135, or neither the exterior first end surface 200 nor any portion of the exterior side surface 205 extends beyond the length of the third fluid aperture 135. The portion of the exterior side surface 205 contained within the third fluid aperture 135 may be adjacent to and in proximate contact with the sidewall 210 of the second housing segment 75, thereby substantially plugging the third fluid aperture 135 when the plug 190 is received within it. Substantially plugging the third fluid aperture 135 may prevent formation of a stagnant fluid zone between the cavity 90 and the first exterior end surface 200 of the plug 190 when the plug 190 is received within the third fluid aperture 135. A stagnant fluid zone may permit chemical by-products of the chlorine generating process, such as hydrogen and oxygen gas, to be trapped in the zone, thereby creating a potentially hazardous situation. It should be noted that the plug 190 may be placed into the second fluid aperture 120 and kept therein with the second nut 50 while the third fluid aperture 135 is connected to a tailpiece (e.g., the second tailpiece 45) by the third nut 55.

Figure 3:
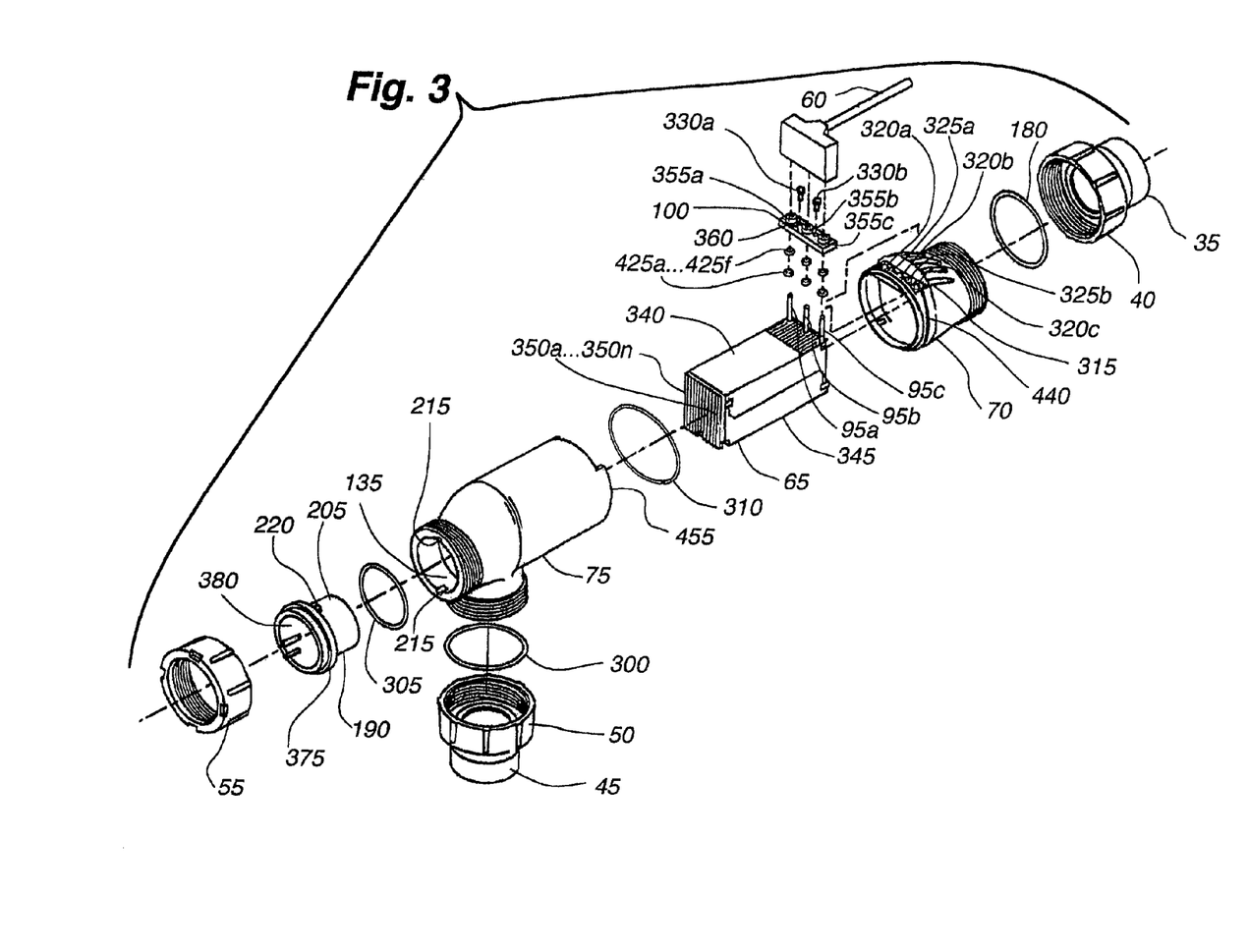
FIG. 3 depicts an exploded perspective view of various components of the embodiment depicted in FIGS. 1 and 2.

The plug 190 may be keyed to prevent it from being placed in certain ports. One exemplary keyed plug 190 is depicted in cross-section in FIG. 2, placed in the third fluid aperture 135. As best shown in FIG. 3, the interior surface 85 of the second housing segment 75, which defines the third fluid aperture 135, may include one or more grooves 215. Turning back to FIG. 2, the exterior side surface 205 of the plug 190 may include one or more bayonets 220 that mate with the grooves 215, thereby permitting the plug 190 to be received within the third fluid aperture 135. The interior surface 85 defining the second fluid aperture 120 may be grooved or keyed in a manner similar to the interior surface 85 defining the third fluid aperture 135. Accordingly, the plug 190 may also be received within the second fluid aperture 120 of the housing 15. In contrast, the interior surface 80 of the first housing segment 70 defining the first fluid aperture 105 may not contain grooves or other keying features. Further, the interior surface 80 of the first housing segment 120 may have a cross-sectional area less than a cross-sectional area of the plug 190 (either with or without the additional cross-sectional area defined by the bayonets 220 extending from exterior surface 205 of the plug 190), thereby preventing the plug 190 from being received within the first fluid aperture 105.

Generally, plugging the first fluid aperture 105 while leaving the second and third fluid apertures 120, 135 in fluid communication with the cavity 90 may allow fluid to enter and exit the cavity 90 without passing along the length of the chlorine generator 65. This may prevent sufficient chlorine from being electrolyzed into the fluid stream passing through the depicted embodiment of the chlorine generator 65. Accordingly, keying the plug 190 so that it may associated only with the second and third fluid apertures 120, 135 helps to prevent inadvertently plugging the first fluid aperture 105 with the plug 190. Other methods of keying the plug 190, other than the one described above, could be utilized. For example, the interior surface of the fluid aperture and the exterior surface 205 of the plug 190 could be stepped, grooved, or threaded. As another example, the plug 190 could have a ramped exterior surface 205 with certain of the fluid apertures of the housing 15 adapted to receive such a plug 190.

As shown in FIG. 2, the plug 190 may be a substantially solid body. However, the plug 190, in some embodiments, may include a cavity, which may be defined by interior end and interior side surfaces of the plug 190. A cavity within the plug 190 may allow the plug 190 to substantially fill a fluid aperture while reducing the amount of material used in the plug 190. Since the inner and outer side surfaces of the plug 190 may define a relatively thin side wall, plug 190 may adapt to potential non-uniform dimensions of an interior surface of the fluid aperture and/or to form a relatively snug fit between the exterior side surface of the plug 190 and an interior surface of the fluid aperture. The plug 190 may be composed of metal, plastic, rubber, concrete, carbon composites, or another suitable material, or some combination thereof.

Operation of the embodiment depicted in FIG. 2 involves flowing a fluid (such as water) through the cavity 90 in the housing 15. The fluid flows into the cavity 90 through the passage defined by the first tailpiece 35 and the first housing segment 70, and flows out of the cavity 90 through the passage defined by the second tailpiece 45 and the second housing segment 75. It should be noted that this flow path may be reversed. The plug 190, in this particular illustration, prevents fluid from entering or exiting the cavity 90 through the third fluid aperture 135. As fluid flows in and out of the cavity 90, the fluid passes through and along the chlorine generator 65 (and particularly across the electrolytic plates of the generator 65, described below). This generates chlorine in the fluid by electrolyzing chlorine salts contained within the fluid. Thus, the fluid may be chlorinated before it exits the cavity 90.

The aforementioned electrolysis may also generate by-products such as hydrogen and oxygen, since water may be electrolyzed along with the salt. The chlorine salts contained within the fluid can be any salt containing chlorine, such as sodium chloride (NaCL) or others as known to those skilled in the art. Chlorine salts may be selectively added to the fluid prior to it entering the cavity 90.

Although fluid is described as flowing into the cavity 90 through the first fluid aperture 105 in the housing 15 and out of the cavity 90 through second fluid aperture 120 of the housing 15, fluid could flow in the opposite direction. In other words, fluid could flow into the cavity 90 through the second fluid aperture 120 and out of the cavity 90 through the first fluid aperture 105. Further, the plug 190 could be operatively associated with the second fluid aperture 120 rather than the third fluid aperture 135, thereby allowing fluid to either flow into or out of the cavity 90 through the third fluid aperture 135 while preventing fluid from flowing into or out of the cavity 90 through the second fluid aperture 120. Further, the plug 190 may be omitted. For example, fluid may flow into the cavity 90 through both the second and third fluid apertures 120, 135 or out of the cavity 90 through both fluid apertures 120, 135.

Although the embodiment in FIG. 2 depicts three ports 110, 125, 140 and three fluid apertures 105, 120, 135 in fluid communication with the cavity 90, other embodiments of an apparatus for chlorinating a fluid could have more than three ports and/or fluid apertures. For example, there could be five ports in the housing with three ports at one end and two at the opposite end. Each of the five ports could be associated with a fluid aperture that extends from the port to the cavity 90. In such an embodiment, three plugs could be provided with, two plugs being keyed for placement in one or more of the three ports at the one end and one plug being keyed for placement in at least one of the two ports at the other end. In some other embodiments, some or all of the ports may be in direct fluid communication with the cavity 90 rather than in fluid communication with the cavity 90 via a fluid aperture. In still other embodiments, two or more of the ports may be in fluid communication with fluid apertures that combine to form a single fluid aperture that extends to the cavity 90. Other combinations of ports, fluid apertures, and plugs, other than those described herein, are possible.

The tailpieces 35, 45 and the plug 190 are depicted in FIG. 2 as being removably connected to the housing 15 using nuts 40, 50, but other methods of associating the tailpieces 35, 45 and plug 190 may be used. For illustrative purposes, some of the potential methods for associating a tailpiece with the housing 15 will be described. Similar methods could be used for the plug 190. Further, these descriptions are merely illustrative and are not intended to limit the ways to associate tailpieces and/or plugs with the housing 15. Rather than using a nut, a sleeve could be used to operatively associate a tailpiece with the housing 15. The sleeve could include an aperture adapted to have an exterior surface of the housing 15 and an exterior surface of a tailpiece press fit into the aperture. As another example, the end portions of a tailpiece and the housing 15 could each include a flanged portion containing aligned apertures adapted to receive fasteners such as bolts, rivets, screws, etc. These flanged ends could be brought into contact and the fasteners received through the aligned apertures to operatively associate the tailpiece with the housing. The plug 190 and/or tailpiece may be compression-fitted to a port in the housing 15. Additional alternatives will be apparent to those of ordinary skill in the art upon reading this disclosure and accordingly are embraced herein.

Alternatively, rather than using a nut or other component to operatively associate a tailpiece with the housing 15, the tailpiece could be directly attached to the housing 15. For example, an end portion of a tailpiece could be adapted receive an exterior surface of the housing 15 within an aperture in the tailpiece. Further, the end portion of the tailpiece could have threads on an interior surface matching threads on the exterior surface of the housing 15, thereby enabling the received housing 15 section to be threadedly associated with the tailpiece. Alternatively, the end portion of a tailpiece could be adapted to be received within the fluid aperture defined by an interior surface of the housing 15. Further, the end portion of the tailpiece could have threads on an exterior surface matching threads on the interior surface of the housing 15, thereby enabling the received tailpiece to be threadedly associated with the port section. The threading may also be reversed, such that the housing has exterior threads and the tailpiece interior threads. Rather than using threads to directly operatively associate a tailpiece with the housing 15, the tailpiece could be adapted to be press-fitted either into a fluid aperture defined by an interior surface of the housing 15 or onto an exterior surface of the housing 15. Directly associating the tailpiece with the housing 15 could also be done by providing in the end surface of the tailpiece a groove adapted to receive a bayonet in the end surface of the housing 15, or vice versa. An adhesive such as a glue, epoxy, meltable o-ring, etc. could be received within the groove or between the contacted end surfaces of the housing 15 and the tailpiece to directly associate the tailpiece with the housing 15.

Although the apparatus for chlorinating fluid has been described as using tailpieces 35, 45 to deliver fluid to and from the ports 110, 125, 140 of the housing 15, fluid can be delivered without using one or more of the tailpieces 35, 45. Other fluid conduits that deliver water to and from the housing 15 (e.g., a pipe, tube, duct, channel, etc.) could be attached, affixed to, or otherwise associated directly with the housing 15 rather than being associated with the tailpieces 35, 45. When not using a tailpiece 35 to connect a fluid conduit with the housing 15, the fluid conduit may be connected with the housing 15 using methods similar to those herein described for connecting the tailpieces 35, 45 to the housing 15. For example, the fluid conduit could be connected with the housing 15 using a nut, a sleeve, or other component, or could be attached without using other components.

FIG. 3 depicts an exploded perspective view of various components of the embodiment depicted in FIGS. 1 and 2. The components of the embodiment may include the first housing segment 70, the second housing segment 75, the chlorine generator 65, one or more seal elements 180, 300, 305, a bond element 310, the adapter terminal 100, the plug 190, nuts 40, 50, 55, and one or more tailpieces 35, 45. The first and second housing segments 70, 75 may be separate in order to receive the chlorine generator 65 within the interior cavity 90 during assembly of the embodiment. A recessed surface 315 of the first housing segment 70 may include one or more apertures 320a-c that may receive the one or more electrical connections 95a-c. In the present embodiment, three apertures 320a-c receive three electrical connections 95a-c. One or more walls 325a-b may extend from the recessed surface 315. These walls 325a-b may have interior surfaces defining fastener apertures operative to receive fasteners 330a-b such as a screws, bolts, rivets, or other fastening components. One or more of these fastener apertures may be threaded to mate with threaded fasteners.

The chlorine generator 65 may include a body defined by two body segments 340, 345. Each body segment 340, 345 may be generally clamshell shaped to form a generally elongated cube shape for the body of the chlorine generator 65 when joined. The longitudinal axis of the chlorine generator's 65 body may be generally parallel to the longitudinal axis of the cavity 90 and housing 15 when the chlorine generator 65 is received within the housing 15 after assembly, as described below. The chlorine generator 65 may include one or more plates 350a-n, which may be fitted within the joined body segments 340, 345 of the chlorine generator 65. The plates 350a-n may be electrically charged (via the power cord 60 and electrical connections 95a-c) to electrolyze a chlorine salt suspended in the fluid flowing through the cavity 90 of the housing 15, as described above. The electrical connections 95a-c may extend from an end of the chlorine generator 65. Assembly of the chlorine generator 65 is described in more detail with respect to FIG. 9, below.

The terminal adapter 100 may include one or more circular protrusions 355a-c extending from a first surface 360 of the terminal adapter 100. Each protrusion 355a-c may include an interior surface defining an electrical connection aperture to receive an electrical connection 95 of the chlorine generator 65. These electrical connection apertures may be co-axially aligned with an electrical connection hole that extends from the first surface 360 to an opposing second surface of the terminal adapter 100. The second surface of the terminal adapter 100 may approximately match the recessed surface 315 of the housing 15. The terminal adapter 100 may include a pair of fastener apertures for receiving fasteners 330a-b to join the terminal adapter 100 to the housing 15.

The plug 190 may have a generally cylindrical side wall 205. A lip 375 extending from the side wall 205 may also be generally cylindrical. The first end surface 200 (see FIG. 2) and a second end surface 380 may be generally circular. Likewise, the first, second, and third nut 40, 50, 55 may have generally cylindrical bodies. The apertures defined by the bodies of the first, second, and third nut 40, 50, 55 may be generally cylindrical and adapted to generally mate with the first or second housing segment 70, 75 as described above.

The tailpieces 35, 45 may have generally cylindrical bodies. Lips extending from the exterior surfaces of the tailpieces 35, 45 may also generally cylindrical. As shown in FIG. 3, the seal elements 180, 300 seated within each tailpiece 35, 45 may be O-rings. Seal elements 180, 300, 305 may be composed of rubber or any other material capable of forming a watertight seal between the two connected elements.

Figure 4:
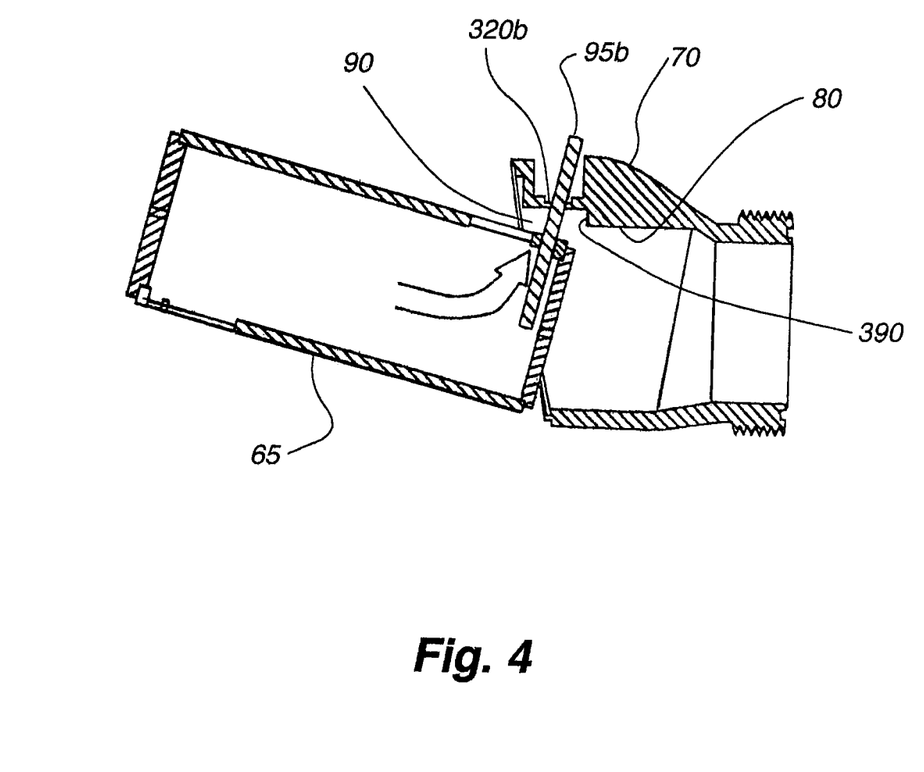
FIG. 4 depicts a cross-sectional view indicating a method of inserting electrical connections of a chlorine generator through holes in the housing of the embodiment.

To assemble the embodiment depicted in FIG. 3, the electrical connections 95a-c of the chlorine generator 65 may be inserted through corresponding apertures 320a-c defined in the recessed area 315 of the first housing segment 70 prior to joining the first and second housing segments 70, 75. As shown in FIG. 4, the electrical connections 95a-c may be inserted at an angle relative to the longitudinal axis of the first housing segment 70. As the electrical connections 95a-c are further inserted through the apertures 320a-c, the body of the chlorine generator 65 may be pivoted such that the longitudinal axes of the electrical connections 95a-c may become generally transverse to the longitudinal axis of the cavity 90 and first housing segment 70. The electrical connections 95a-c may continue to be inserted through their corresponding apertures 320a-c until the body of the chlorine generator 65 contacts or approximately contacts the interior surface 80 of the first housing segment 70 as depicted in FIG. 2. A step 390 may be formed in the interior sidewall of the first housing segment 70 to facilitate positioning the chlorine generator 65 within the cavity 90. The chlorine generator 65 may be tilted into the first housing segment 70 until an upper corner of the generator 65 seats within the aforementioned step 390 in the first housing segment 79. When the second housing segment 75 is fitted to the first housing element 70, grooves 400a-b (see FIG. 7) defined in the second housing segment 75 may accept corners of the chlorine generator 65.

Turning back to FIG. 3, electrical seal elements 425a-f may be received on the electrical connections 95a-c through apertures defined by the bodies of the electrical seal elements 425a-f. The second surface of the terminal adapter 100 (i.e., the surface opposite the first surface 360 of the terminal adapter 100) may be brought into contact with the recessed surface 315 of the first housing segment 70 by receiving the electrical connections 95a-c through corresponding apertures in the terminal adapter 100. Fasteners 330a-b may be inserted through the holes in the terminal adapter 100 and threadedly received within the holes defined by the walls 325a-b extending from the recessed surface 315 of the housing 15. As the fasteners 330a-b are tightened, the second end surface of the terminal adapter 100 may be pressed against the recessed surface 315, thereby compressing the electrical seal elements 425a-f between the second surface and the recessed surface 315. Compression of the electrical seal elements 425a-f between the second end surface and the recessed surface 315 may facilitate a watertight seal between the joint formed between the terminal adapter 100 and the first housing segment 70, which may help to prevent fluid from leaking out of the housing 15. The electrical seal elements 425a-f may be composed of rubber or any other material capable of forming a watertight seal between the two connected elements.

The first and second housing segments 70, 75 may be joined together. Prior to joining, the bonding element 310 may be placed between joined end surfaces of the first and second housing segments 70, 75. In the depicted embodiment, the bonding element 310 may be an O-ring, which may be received within a groove 430 (see FIG. 7) in the second housing segment 75. As the first and second housing segments 70, 75 are joined, an annular projection 435 (see FIG. 5) on the first housing segment 70 may be received within the groove 430 of the second housing segment 75, which may contain the bonding element 310. The bonding element 310 may be composed of a material that melts when exposed to a specific heat. In one embodiment, the bonding element 310 is made of a polymer containing magnetic particles, which melt the polymer by absorbing energy when exposed to an energy field such as a RF field and radiating it in the form of heat to melt the polymer. Melting the bonding element 310 will seal the first housing segment 70 to the second housing segment 75. It should be noted that the seal so formed may be watertight. Although a meltable bonding element 310 may be used both to seal and join the first and second housing segments 70, 75, other methods of sealing and joining the first and second housing segments 70, 75 may be utilized. For example, an O-ring similar to that described above for the seal elements 180, 300, 305 may be used to seal the housing segments 70, 75. Alternatively, an epoxy, glue, or other adhesive may be used to join together the first and second housing segments 70, 75. As yet another option, the housing segments 70, 75 may be sonically welded or heat-welded to one another directly.

The seal elements 180, 300, 305 may be placed in grooves located either the tailpieces 35, 45, plugs 190, or housing segments 70, 75 as described above, and the tailpieces 35, 45 and plugs 190 may be connected to the first and second housing segments 70, 75 using the nuts 40, 50, 55 as described above. The power cord 60 may be connected to the electrical connections 95a-c to supply power to the electrolytic plates 350a-n within the chlorine generator 65, thus permitting formation of chlorine within the fluid as described herein.

Figures 5, 6, 6A:
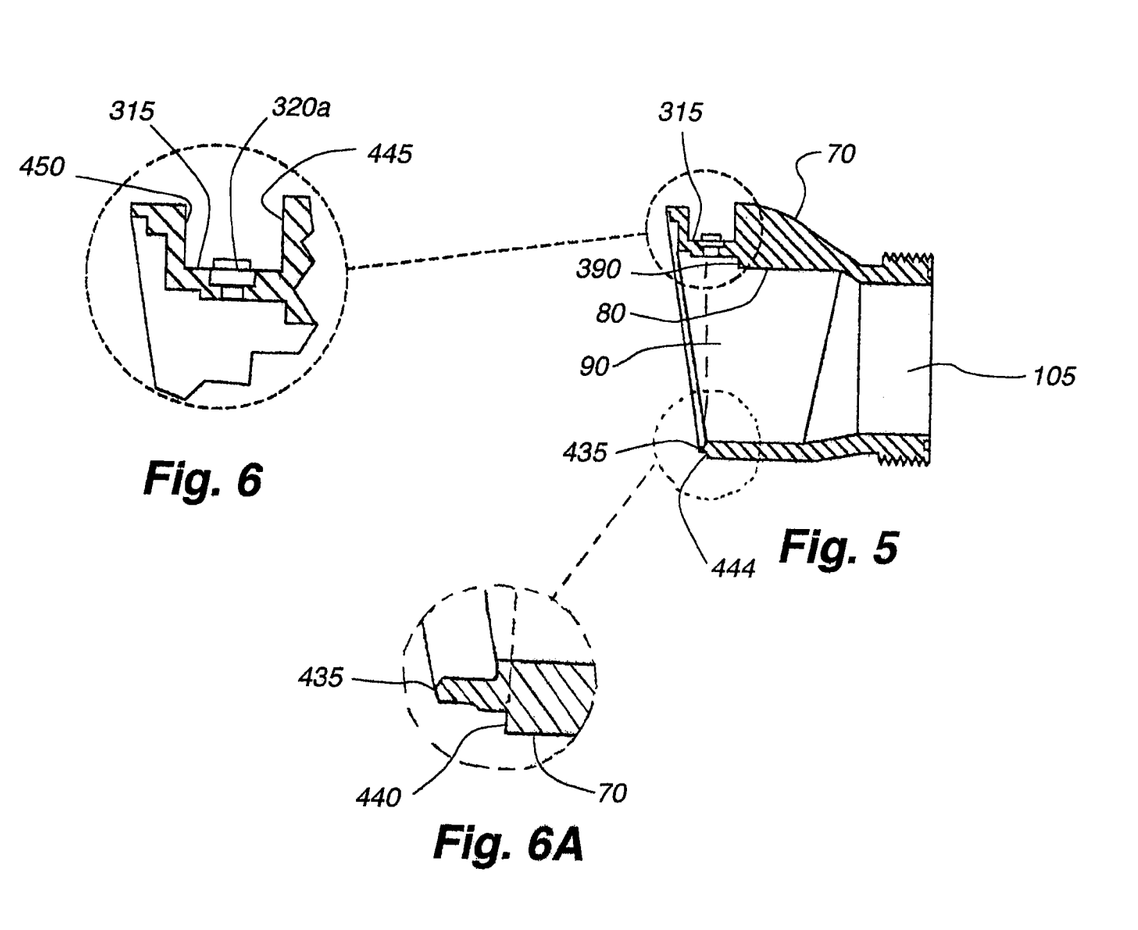
FIG. 5 depicts a cross-sectional view of the first housing segment depicted in FIGS. 1-3.
FIG. 6 depicts an exploded view of a portion of the cross-sectional view of the embodiment depicted in FIG. 5.
FIG. 6A depicts an exploded view of a second portion of the cross-sectional view of the embodiment depicted in FIG. 5.

FIG. 5 depicts a cross-sectional view of the first housing segment 70 depicted in FIGS. 1-3. A portion of the interior surface 80 may define an interior, first cavity segment to receive a portion of the chlorine generator 65. Near the recessed surface 315, the interior side wall 80 of the first housing segment 75 may form a step 390, thereby slightly increasing the size of the cavity proximate the recessed surface 315 to receive the body of the chlorine generator 65. The longitudinal axis of the first fluid aperture 105 may be generally parallel to the longitudinal axis of the cavity 90 as depicted in FIG. 5, or may be transverse to the longitudinal axis. A second end surface 440 (i.e, a step on the first housing segment 70's exterior and vertical to the longitudinal axis, represented by dashed lines in FIG. 5 and FIG. 6A) of the first housing segment 70 forms an annular surface that may include an annular projection 435 extending there from and adapted to be received within the groove 430 (see FIG. 7) of the second housing segment 75. When viewed from a side elevation (as shown in the cross-sectional view of FIG. 5), the annular projection 435 forms an inclined, upwardly sloping line from the bottom side of the first housing segment 70 to the top side of the first housing segment 70.

FIG. 6 depicts an exploded view of a portion of the cross-sectional view of the embodiment depicted in FIG. 5. The exploded view depicts the recessed surface 315 and an electrical connection aperture 320a. A pair of generally parallel side walls 445, 450 extending from the recessed surface 315 define a recessed area. FIG. 6a depicts an exploded view of another portion of the cross-section view of the embodiment depicted in FIG. 5. This exploded view depicts the annular projection 435 extending from the second end surface 440 of the first housing segment 70.

Figure 7:
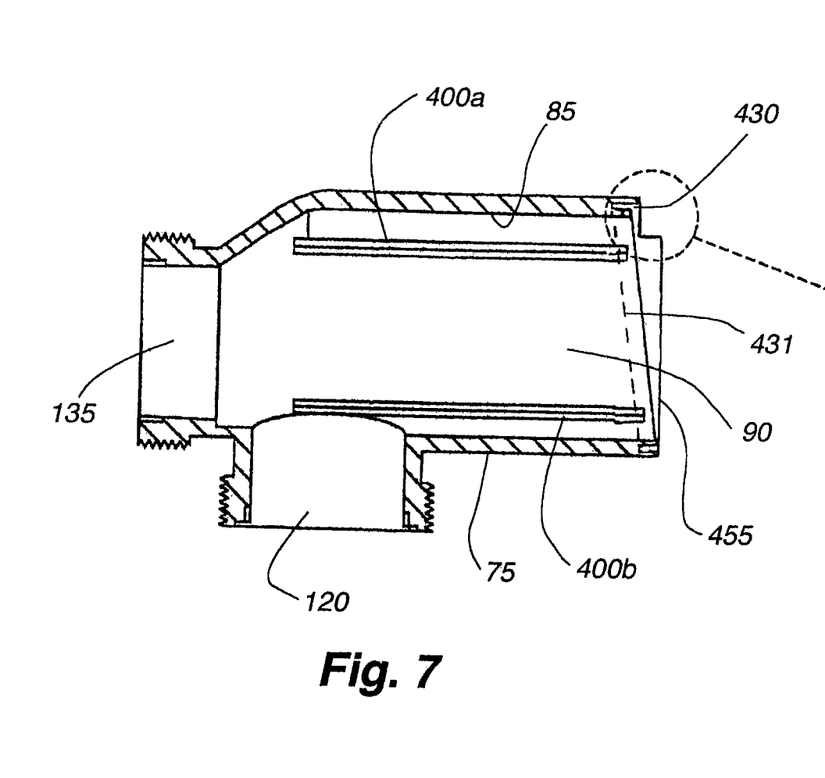
FIG. 7 depicts a cross-sectional view of the embodiment of the second housing segment depicted in FIGS. 1-3.

FIG. 7 depicts a cross-sectional view of the embodiment of the second housing segment 75 depicted in FIGS. 1-3. A portion of the interior surface 85 of the second housing segment 75 may define a second cavity segment adapted to receive a portion of the chlorine generator 65. (When the first and second housing segments 70, 75 mate, the first and second cavity segments form the aforementioned cavity 90.) The longitudinal axis of the second fluid aperture 120 may be generally transverse to the longitudinal axis of the cavity 90 as depicted in FIG. 7. The longitudinal axis of the third fluid aperture 135 may be generally parallel to the longitudinal axis of the cavity 90 as depicted in FIG. 7. The third end surface 455 of the second housing segment 75 may form a partial annular surface, which may include the groove 430, with inclined groove bottom 431, adapted to receive the bond member 310 and the annular projection 435 of the first housing segment 70. This third end surface 455 is generally flat and round in end view. From a side elevation view, the groove bottom 431 generally angles towards the third fluid aperture 135 from the bottom to the top of the second housing segment 75. When the two housing segments 70, 75 are joined, the third end surface 455 of the second housing segment 75 generally abuts the second end surface 440, on the exterior of the first housing segment 70.

Figure 8:
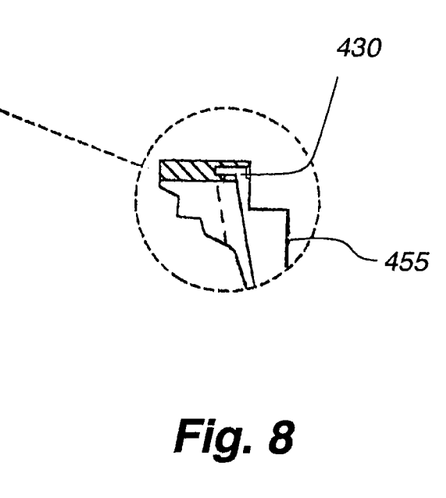
FIG. 8 depicts an exploded view of a portion of the cross-sectional view of the embodiment depicted in FIG. 7.

FIG. 8 depicts an exploded view of a portion of the cross-sectional view of the embodiment depicted in FIG. 7. The exploded view depicts an upper portion of the third end surface 445 and the groove 430 adapted to receive the annular projection 435 of the first housing segment 70.

Although the housing 15 has been described with reference to FIGS. 2-8 as having two segments 70, 75, in some embodiments the housing 15 may be composed of three or more segments or pieces that when joined define a cavity for containing the chlorine generator 65 and ports in fluid communication with the cavity.

Figure 9:
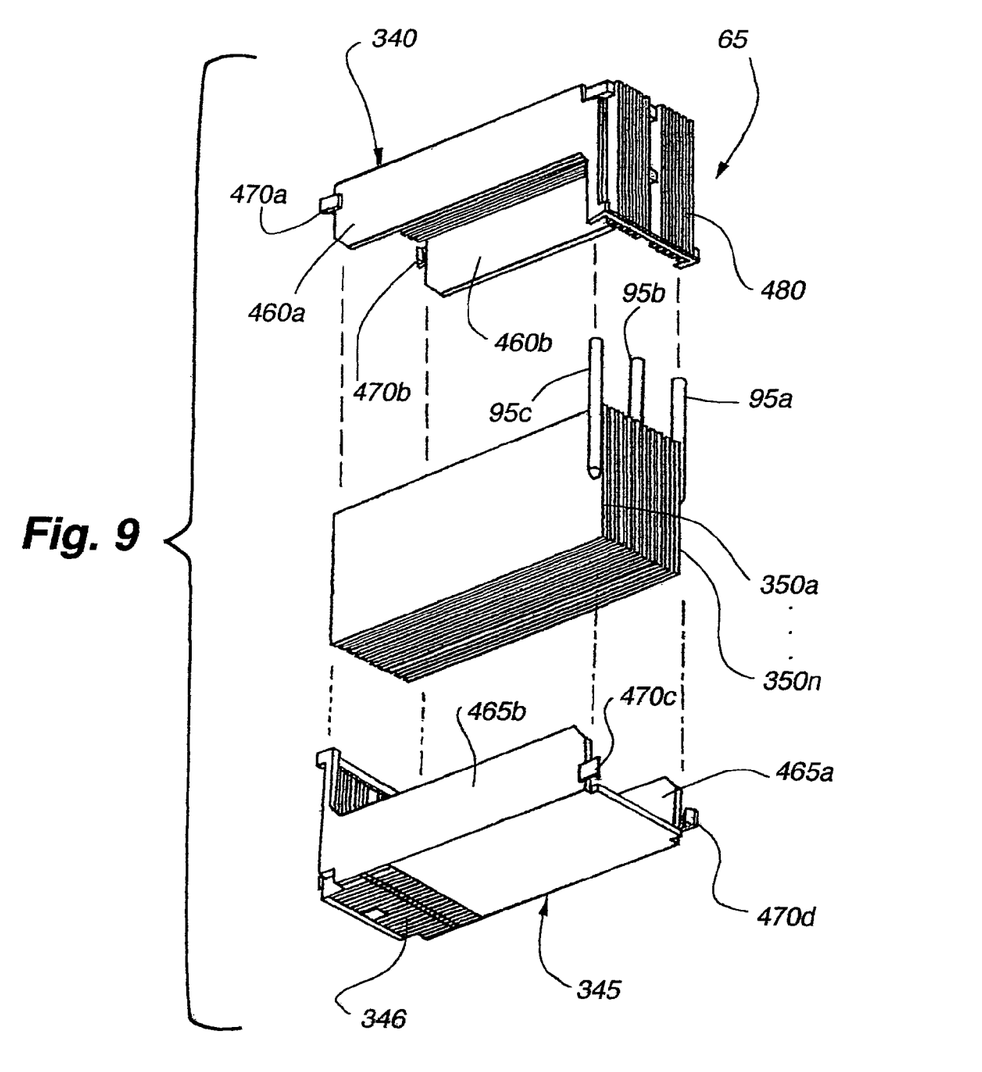
FIG. 9 depicts an exploded perspective view of the chlorine generator.

FIG. 9 depicts an exploded perspective view of the chlorine generator 65. The chlorine generator 65 may include a first body segment 340, a second body segment 345, and one or more electrolytic plates 350a-n. Each body segment 340, 345 may include a pair of opposing side walls 460a-b, 465a-b. L-shaped tabs 470a-d may extend from the side walls 460a-b, 465a-b. The L-shaped tabs 470a-d may be flexible and may help to maintain the relationship between the two body segments 340, 345 when the two body segments 340, 345 are joined. Joining the side walls 460a-b of the first body segment 340 is a third wall. Extending from the third wall are one or more optional projections defining grooves operative to receive the plates 350a-n. An end wall 480 may separate the pair of opposing side walls 460a-b. The end wall 480 may one or more openings to allow fluid to flow through the end wall 480. The second body segment 345 is similar to the first body segment 340. One or more openings 346 may be formed in the third wall of a body segment 345 to allow fluid to flow through the body segment and across the plates 350a-n. Although the body segments 340, 345 are depicted as substantially identical, they may in some embodiments not be identical. For example, the may be designed so that they appear to be mirror image of each other or so that appear to be split asymmetrically, while retaining the general overall shape of the chlorine generator 65 when joined. Certain of the of the plates 350a-n may include an electrical connection 95a attached to and extending from the plate.

To assemble the chlorine generator 65, the plates 350a-n may be inserted into the grooves of one of the body segments 340, 345. The plates 350a-n that include electrical connections 95a-c may be inserted into grooves that generally align with the apertures in the third wall of the first body segment 340. The electrical connections 95a-c may be inserted through the apertures. The grooves of the second body segment 345 may be aligned with the plates 350a-n received within the first body segment 340 so that the first and second body segments 345 may be slid together. As the side walls 460a-b, 465a-b of the first and second body segments 340, 345 approach the end walls 480, 485 of the other body segment, the flexible L-shaped tabs 470a-d may be pushed apart. When the extended portion of the flexible L-shaped tabs 470a-d clear the end walls 480-485, the L-shaped tabs 470a-d may return towards their initial position and engage the end wall of the other body segment. The engagement of the L-shaped tabs 470a-d with the end walls 480, 485 may prevent the first and second body segments 340, 345 from sliding apart once joined.

All directional references (e.g., upper, lower, upward, downward, left, right, leftward, rightward, top, bottom, above, below, vertical, horizontal, clockwise, and counterclockwise) are only used for identification purposes to aid the reader's understanding of the embodiments of the present invention, and do not create limitations, particularly as to the position, orientation, or use of the invention unless specifically set forth in the claims. Joinder references (e.g., attached, coupled, connected, joined, and the like) are to be construed broadly and may include intermediate members between a connection of elements and relative movement between elements. As such, joinder references do not necessarily infer that two elements are directly connected and in fixed relation to each other.

In some instances, components are described with reference to "ends" having a particular characteristic and/or being connected with another part. However, those skilled in the art will recognize that the present invention is not limited to components which terminate immediately beyond their points of connection with other parts. Thus, the term "end" should be interpreted broadly, in a manner that includes areas adjacent, rearward, forward of, or otherwise near the terminus of a particular element, link, component, part, member or the like. In methodologies directly or indirectly set forth herein, various steps and operations are described in one possible order of operation, but those skilled in the art will recognize that steps and operations may be rearranged, replaced, or eliminated without necessarily departing from the spirit and scope of the present invention. It is intended that all matter contained in the above description or shown in the accompanying drawings shall be interpreted as illustrative only and not limiting. Changes in detail or structure may be made without departing from the spirit of the invention as defined in the appended claims.

What is claimed is:

1. An apparatus for generating chlorine, comprising:
   a housing defining a cavity;
   a chlorine generating apparatus within the cavity and removably anchored directly to the housing;
   at least three ports defined on the housing and in fluid communication with the cavity; and
   a plug configured to selectively connect with at least one of the at least three ports,
   wherein the plug is operative with only two of the at least three ports.

2. The apparatus of claim 1, wherein when the plug is operably connected with at least one of the at least three ports, the plug substantially prevents fluid communication between the at least one of the at least three ports and the cavity.

3. The apparatus of claim 1, further comprising a sensor configured to measure temperature, salinity, chlorine concentration, and/or flow rate of a fluid flowing through the cavity.

4. The apparatus of claim 1, wherein the housing comprises a first housing element and a second housing element attached to the first housing element, which together define a cavity containing the chlorine generating apparatus.

5. The apparatus of claim 4, wherein the first housing element and the second housing element are joined at an inclined line relative to a longitudinal axis of the first housing element such that the chlorine generating apparatus is tilted into the first housing element to facilitate positioning of the chlorine generating apparatus within the cavity.

6. The apparatus of claim 4, further comprising a plurality of electrical connections associated with the chlorine generating apparatus and a plurality of electrical connection apertures defined on the housing and configured to receive the plurality of electrical connections.

7. The apparatus of claim 6, wherein the first housing element and the second housing element are joined proximate the plurality of electrical connection apertures.

8. The apparatus of claim 4, further comprising a sealing member configured to seal the first and second housing elements together, wherein the sealing member comprises a meltable O-ring.

9. The apparatus of claim 4, further comprising a groove defined in the first housing element configured to receive a matching annular projection defined in the second housing element when the first and second housing elements are joined, the groove configured to receive a sealing member.

10. The apparatus of claim 1, wherein the chlorine generating apparatus comprises an electrolytic cell.

11. The apparatus of claim 1, wherein the chlorine generating apparatus comprises:
    a body including a first body element and a second body element; and
    a plurality of plates.

12. The apparatus of claim 1, further comprising at least one tailpiece comprising an aperture, the tailpiece removably connected to the housing and configured to be operatively associated with a fluid conduit associated with a pool piping system.

13. An apparatus for generating chlorine, comprising:
    a housing defining a cavity;
    a chlorine generating apparatus within the cavity and removably anchored directly to the housing;
    at least three ports defined on the housing and in fluid communication with the cavity; and
    a plug configured to selectively connect with at least one of the at least three ports, the plug also comprising a key, wherein
    at least two of the at least three ports comprises a key receptacle configured to receive the key.

14. The apparatus of claim 13, further comprising a sensor configured to measure temperature, salinity, chlorine concentration, and/or flow rate of a fluid flowing through the cavity.

15. The apparatus of claim 13, wherein the housing comprises a first housing element and a second housing element attached to the first housing element and the first and second housing elements together define a cavity containing the chlorine generating apparatus.

16. The apparatus of claim 15, further comprising a groove defined in the first housing element configured to receive a matching annular projection defined in the second housing element when the first and second housing elements are joined, the groove configured to receive a sealing member.

17. The apparatus of claim 15, wherein the first housing element and the second housing element are joined at an inclined line relative to a longitudinal axis of the first housing element such that the chlorine generating apparatus is tilted into the first housing element to facilitate positioning of the chlorine generating apparatus within the cavity.

18. The apparatus of claim 13, further comprising a plurality of electrical connections associated with the chlorine generating apparatus and a plurality of electrical connection apertures defined on the housing and configured to receive the plurality of electrical connections.

19. The apparatus of claim 13, wherein the chlorine generating apparatus comprises an electrolytic cell.

20. The apparatus of claim 13, wherein the chlorine generating apparatus comprises:
  a body including a first body element and a second body element; and
  a plurality of plates.

* * * * *